United States Patent [19]

Uehara et al.

[11] Patent Number: 5,495,846
[45] Date of Patent: Mar. 5, 1996

[54] ULTRASONIC DIAGNOSTIC APPARATUS

[75] Inventors: Shoichi Uehara; Dai Morita, both of Tokyo, Japan

[73] Assignee: GE Yokogawa Medical Systems, Limited, Tokyo, Japan

[21] Appl. No.: 256,674

[22] PCT Filed: Feb. 10, 1993

[86] PCT No.: PCT/JP93/00190

§ 371 Date: Jul. 18, 1994

§ 102(e) Date: Jul. 18, 1994

[87] PCT Pub. No.: WO93/15659

PCT Pub. Date: Aug. 19, 1993

[30] Foreign Application Priority Data

Feb. 12, 1992 [JP] Japan ................................. 4-025474

[51] Int. Cl.$^6$ ........................................................ A61B 8/00
[52] U.S. Cl. ........................................................ 128/660.07
[58] Field of Search ..................... 128/660.05, 660.07, 128/661.01; 348/447–448; 382/50, 54

[56] References Cited

U.S. PATENT DOCUMENTS

| | | | |
|---|---|---|---|
| 4,761,740 | 8/1988 | Lipschutz | 128/660.05 |
| 5,083,566 | 1/1992 | Baba | 128/660.05 |
| 5,215,093 | 6/1993 | Miyazaki et al. | 128/661.09 |
| 5,318,033 | 6/1994 | Savord | 128/661.01 |

Primary Examiner—Francis Jaworski
Attorney, Agent, or Firm—Moonray Kojima

[57] ABSTRACT

An object of the present invention is to provide an ultrasonic diagnostic apparatus, which detects a moving part and a stationary part within the same frame and selects a suitable arithmetic averaging coefficient for each of them and thereby keeps well its characteristic to follow up an image and maintains its capability to reduce noises sufficiently. The invention attaining the above mentioned object is characterized by that it comprises:

a frame memory for storing old data which are signals received on a previous occasion;

a weighting function generator obtaining, for each pixel, differential data as the absolute value of the difference between new data, which are signals currently input thereto, and old data read from the frame memory for calculating arithmetic-averaging coefficients "ω" and "1−ω" as weighting functions, which are functions of the new data or the old data and the differential data;

a new data multiplier for multiplying, for each pixel, the new data by the data "1−ω" output from the weighting function generator;

an old data multiplier for multiplying, for each pixel, the old data read from the frame memory by the data "ω" output from the weighting function generator; and an adder for adding up output data of the new data multiplier and output data of the old data multiplier.

1 Claim, 3 Drawing Sheets 5,495,846

ULTRASONIC DIAGNOSTIC APPARATUS

TECHNICAL FIELD

The present invention relates to an ultrasonic diagnostic apparatus having an inter-frame averaging function improved in its averaging characteristic.

BACKGROUND ART

An ultrasonic diagnostic apparatus is such that transmits an ultrasonic signal from its ultrasonic probe into an examined body, receives the signal echoing from tissues or a diseased part of the examined body, and displays a tomographic image formed from the echo signal on a CRT for diagnostic use.

In such an ultrasonic diagnostic apparatus, in the case where the frame rate is low, i.e., where the interval is large between the periods in which the ultrasonic wave is transmitted, if the change between the signal received one frame before and the signal currently received is great, there is produced a flicker on the CRT screen. In order to improve the situation, a method called an inter-frame averaging process to average the previous and current data has been in use.

In the inter-frame averaging process which has so far been in practice, arithmetic averaging of the previous frame data and the current frame data has been performed using a constant arithmetic-averaging coefficient at all times. Accordingly, there have been such problems that, when the examined object is a moving reflector such as a valve of the heart and a flow of blood or when the ultrasonic wave is transmitted and received while the ultrasonic probe is being moved, the characteristic of the apparatus to follow up an image of an internal organ or the like is deteriorated and an afterimage is produced. If the weighting with the arithmetic-averaging coefficient ω is lightened to improve the situation, a difficulty arises that noises increase and a flickering view is produced.

On the other hand, there has been a method in which the absolute value of the differential between the old data and the new data is taken and the value of ω is varied according to the absolute value and such a variable value of ω is used in an arithmetic averaging process. In this method, while the arithmetic-averaging coefficient ω is varied for each frame according to a detected movement of the echoing part, the averaging process for the entire object becomes lighter when there is a moving part in the image and, hence, the averaging process for the portion where there is no movement also becomes lighter and such a difficulty arises that noises cannot be sufficiently removed.

DISCLOSURE OF THE INVENTION

The present invention was made in view of the above situations. An object of the invention is to realize an ultrasonic diagnostic apparatus which detects moving and stationary portions within the same frame, selects a suitable arithmetic-averaging coefficient for each of the portions, and thereby, while improving its characteristic to follow up the image, secures a sufficient noise removing capability.

In order to solve the above mentioned problems, the invention is characterized in that it comprises:

a frame memory for storing old data which are signals received on a previous occasion;

a weighting function generator obtaining, for each pixel, differential data as the absolute value of the difference between new data, which are signals currently inputted thereto, and old data read from the frame memory for calculating arithmetic-averaging coefficients "ω" and "1−ω" as weighting functions, which are functions of the new data or the old data and the differential data;

a new data multiplier for multiplying, for each pixel, the new data by the coefficient "1−ω" outputted from the weighting function generator;

an old data multiplier for multiplying, for each pixel, the old data read from the frame memory by the coefficient "ω" outputted from the weighting function generator; and an adder for adding up output data of the new data multiplier and output data of the old data multiplier.

BEST MODE FOR CARRYING OUT THE INVENTION

An embodiment of the present invention will be described below in detail with reference to the accompanying drawings.

Figure 1:
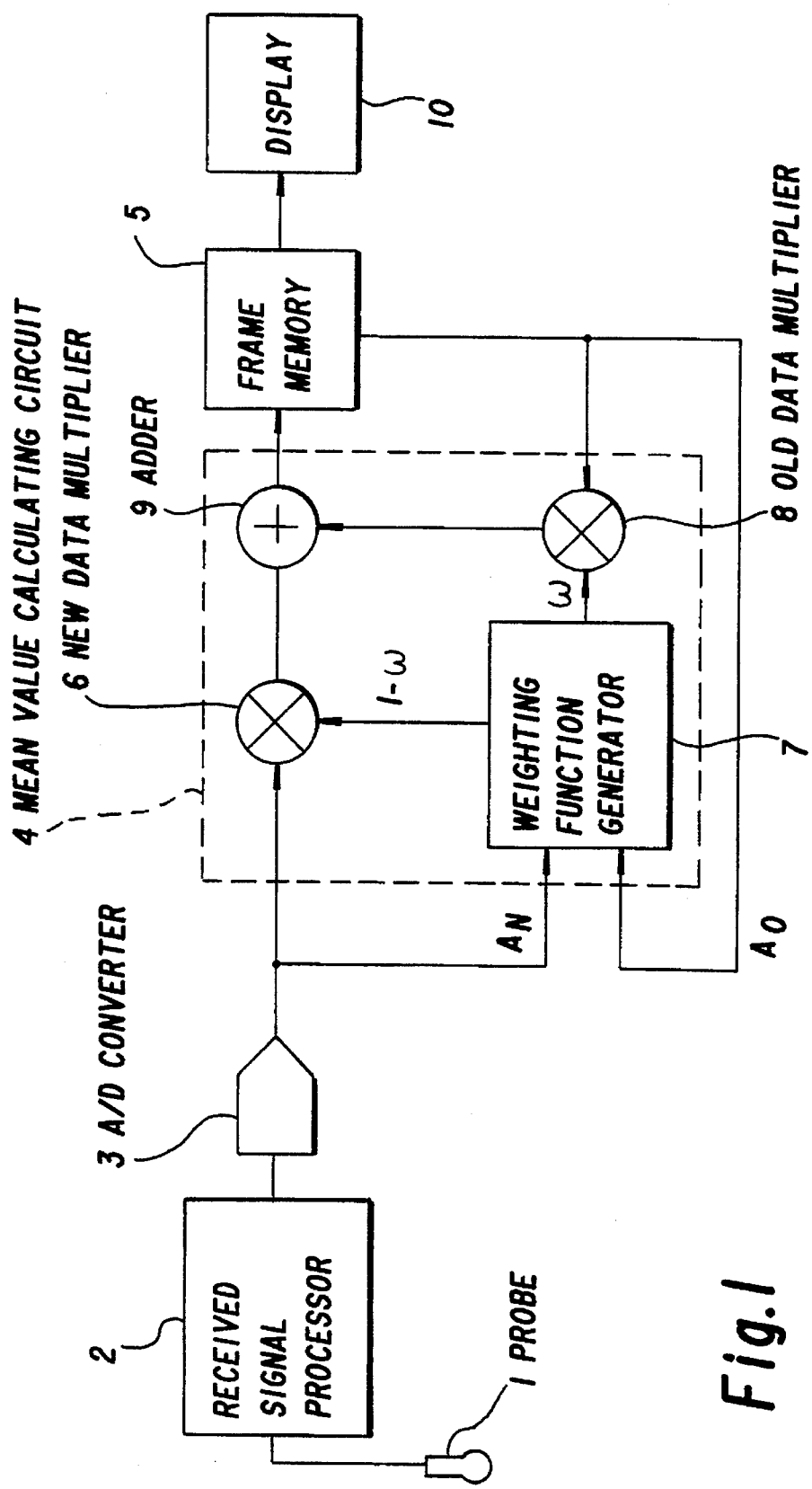
FIG. 1 is a block diagram showing an apparatus as an embodiment of the invention.

FIG. 1 is a block diagram showing an apparatus as an embodiment of the invention. In FIG. 1, only necessary portion for the invention is shown and details of transmission circuitry and reception circuitry are omitted. Referring to FIG. 1, reference numeral 1 denotes a probe for transmitting an ultrasonic wave into an examined body and converting the echoing ultrasonic wave into an electric signal and 2 denotes a received signal processor for processing received signals, i.e., amplifying, phasing and adding, and detecting the electric signals output from the probe 1.

Reference numeral 3 denotes an A/D converter for converting an analog signal output from the received signal processor 2 into a digital signal and its output signal is input to a mean value calculating circuit 4.

Reference numeral 5 denotes a frame memory for storing one frame of old data, i.e., the output of the mean value calculating circuit 4 supplied thereto on a previous occasion. The data as the content of the frame memory 5 is updated each time it receives new ultrasonic signals for one frame.

Reference numeral 6 denotes a new data multiplier receiving new data as the output signal of the AD converter 3 and performing an operation to multiply the new data by a weighting function as the output signal of a weighting function generator 7. The weighting function generator 7 receives new data AN for each pixel as the output of the AD converter 3 and old data AO for each pixel as the output of the frame memory 5 and generates, from the absolute value |AO−AN| of the difference between the new data and old data as the differential data and the new data AN, a weighting function "ω" for each data expressed as $$\omega = f(AN, |AO-AN|) \tag{1},$$

where

AN: amplitude of new data of a pixel

AO: amplitude of old data of the pixel

ω=weighting function.

The weighting function by which new data AN is multiplied in the new data multiplier 6 is "1−ω" calculated from the weighting function "ω" in expression (1).

Reference numeral 8 denotes an old data multiplier receiving old data from the frame memory 5 and performing an operation to multiply the old data by the weighting function ω output from the weighting function generator 7. The outputs of the new data multiplier 6 and the old data multiplier 8 are added together for each pixel in an adder 9 and the sum is output to the frame memory 5.

Reference numeral 10 denotes a display for displaying arithmetically averaged data output from the frame memory 5.

Operations of the embodiment structured as described above will be described using a flowchart of FIG. 2.

The probe 1 converts a received ultrasonic signal into an electric signal and inputs it to the received signal processor 2. The signal is amplified, beam-formed, and detected by the received signal processor 2 and inputted to the mean value calculating circuit 4. The mean value calculating circuit 4 performs operation to calculate the mean value.

Figure 2:
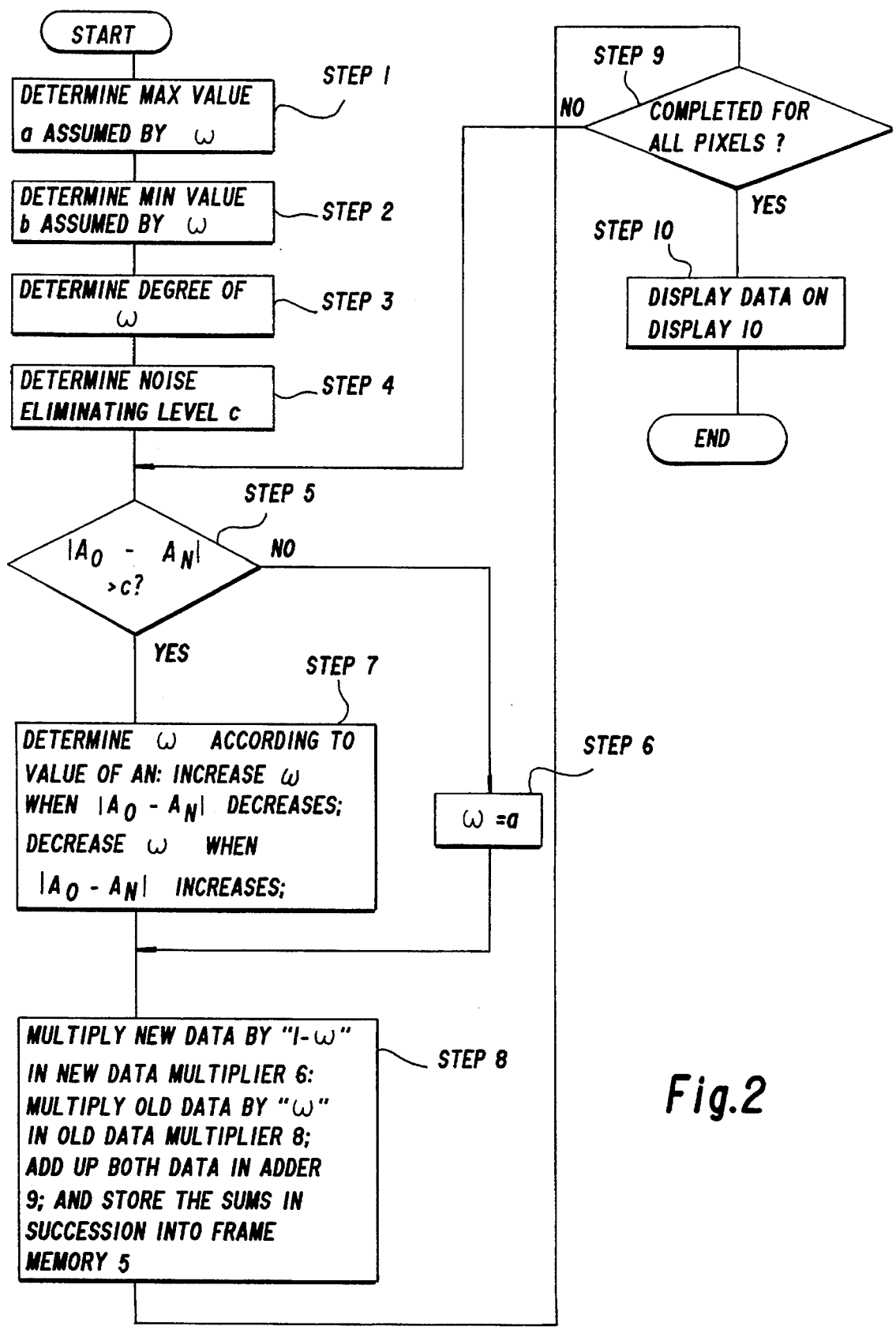
FIG. 2 is a flowchart of operations of the apparatus of the embodiment.

Operation subsequent to the above will be described with reference to the flowchart of FIG. 2.

Figure 3:
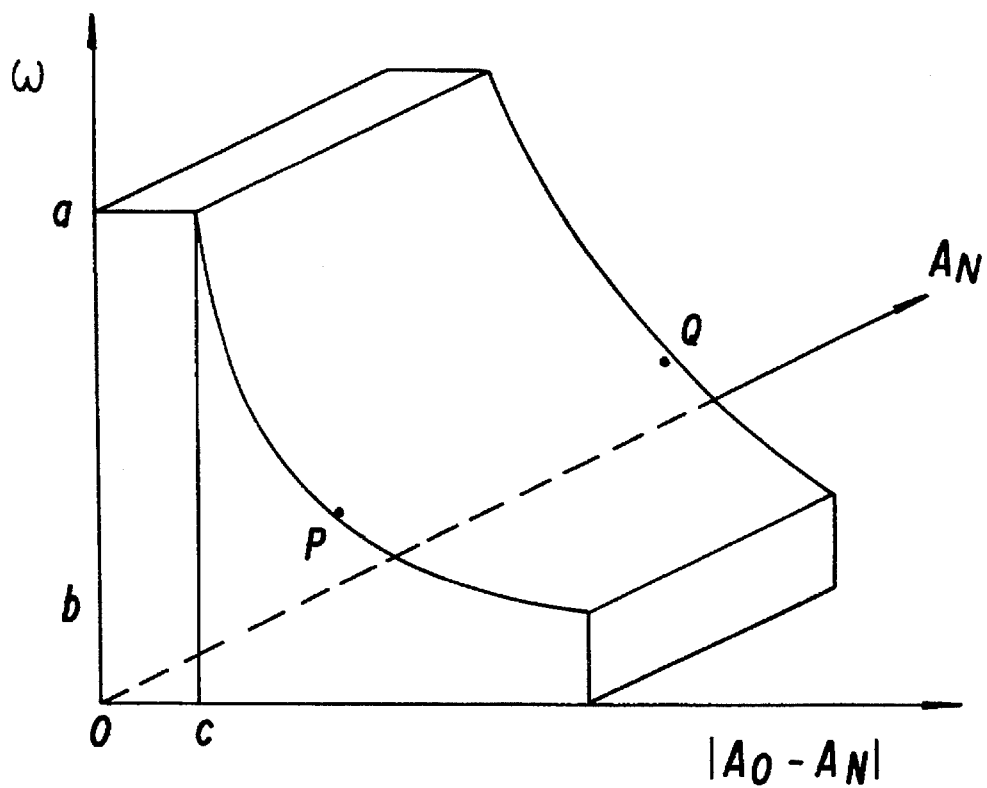
FIG. 3 is a graph showing values of the weighting function relative to the values of new data and differential data.

Since the weighting function ω is a function of new data AN and differential data |AO−AN| as indicated by expression (1), the graph is represented in three dimensions as shown in FIG. 3. Referring to FIG. 3, the differential data |AO−AN| is represented along the axis of abscissas and the new data AN is represented along the axis of ordinates and the weighting function "ω" is represented along the vertical axis. The value a indicates the maximum value that "ω" can assume and the value b indicates the minimum value that "ω" can assume. Further, the value c is the numeric value indicating the minimum value required to eliminate noises. P and Q represent values when the values of the new data AN are different while the values of the differential data |AO−AN| are the same. The degree of the curve on the ω−|AO−AN| plane at the point P and the degree of the curve on the ω−|AO−AN| plane at the point Q are different depending on the different values of the new data AN. Referring to the flowchart, the procedure will be described.

Step 1

The maximum value assumed by the weighting function "ω" is determined (a in FIG. 3) and the value is set in the weighting function generator 7.

Step 2

The minimum value assumed by the weighting function "ω" is determined (b in FIG. 3) and the value is set in the weighting function generator 7.

Step 3

The degrees of the weighting function "ω" are determined. This means that the degrees of the curve at the point P and that at the point Q are determined. The degrees determined are set in the weighting function generator 7.

Step 4

The noise eliminating level c is set in the weighting function generator 7. Thus, when the differential data |AO−AN| is smaller than c, the value a is outputted as the weighting function "ω".

These values are determined in steps 1 to 4 prior to transmission and reception of an ultrasonic wave and set in the weighting function generator 7 of the mean value calculating circuit 4 and the set values are referred to during the data processing shown in the following steps.

Step 5

It is checked whether the differential data |AO−AN| calculated in the weighting function generator 7 is greater than the noise eliminating level c. If it is not greater, the processing advances to step 6. If it is greater, the processing advances to step 7.

Step 6

The weighting function generator 7 sets therein the value of "ω" corresponding to the noise eliminating level c shown in FIG. 3 as ω=a.

Step 7

The weighting function "ω" is determined according to the value of AN and the value of |AO−AN|. The weighting function "ω" is determined as follows:

when |AO−AN| decreases, ω increases; and when |AO−AN| increases, ω decreases.

Step 8

The value "1−ω" is calculated from the weighting function "ω" calculated in step 6 and step 7. Then, the new data multiplier 6 multiplies the new data by "1−ω" and outputs the product to the adder 9. Meanwhile, the old data multiplier 8 multiplies the old data input thereto from the frame memory 5 by "ω" and outputs the product to the adder 9. The adder 9 performs calculation as under:

$$AV = AO \times \omega + AN \times (1-\omega),$$

where AV:

the amplitude as the result of the arithmetic averaging process for a pixel.

The results of calculation performed in the adder 9 are successively stored into the frame memory 5.

Step 9

It is checked whether the above processing is completed for all of the pixels. If it has not yet been completed, the processing returns to step 5. If it has been completed, the processing advances to step 10.

Step 10

An image is displayed on the display 10.

The three-dimensional curve of FIG. 3 is stored in the weighting function generator 7 and, when new data is different, a different weighting function "ω" is selected even if the differential data |AO−AN| is the same.

According to the embodiment as described above, the arithmetic-averaging coefficient is not selected for each frame but selected individually depending on the state of each pixel. Consequently, it becomes possible to construct the image using a coefficient suited for each part of the living body structure. More specifically, such operation as to decrease the coefficient for a moving part and to increase the coefficient for a stationary part is performed.

Further, by using the differential data |AO−AN| as a parameter for determining the coefficient, it can be detected whether the object is moving or stationary. Accordingly, by selecting a small coefficient for such an object as the valve of the heart which produces great changes of brightness in the image, occurrence of the afterimage can be reduced.

Further, since the curve on the ω−|AO−AN| plane varies as a function of the new data AN as shown in FIG. 3, whether a change in the brightness is that from low brightness to high brightness or that from high brightness to low brightness can be discriminated even if the differential data |AO−AN| is the same. Accordingly, in the scanning of the liver, for example, when echoing from a tissue of high brightness was received in the preceding frame and then the probe was moved to direct the ultrasonic wave into a position to select a blood vessel of low brightness in the following frame, the value ω at the point P in FIG. 3 comes to be selected. Consequently, the averaging process can be made relatively light and, hence, it becomes possible to better the passing through the blood vessel (to bring the image closer to a still image).

While f(AN, |AO−AN|) was used as the function f in the above embodiment, f(AO, |AO−AN|) may be used, instead.

According to the present invention, as described above in detail, by detecting a moving part and a stationary part within the same frame and selecting a weighting function as a suitable arithmetic averaging coefficient for each of them, it becomes possible to better the characteristic of the apparatus to follow up an image and, in the meantime, to sufficiently suppress occurrence of noises. Hence, a great merit in the practical use can be obtained.

We claim:

1. An ultrasonic diagnostic apparatus which performs interframe averaging to smooth out changes in image data between frames, said apparatus comprising:

weighting function generator means;

means for setting in said weighting function generator means a maximum value of $\omega$, a minimum value of $\omega$, a minimum value of the absolute value of the difference in new frame data and old frame data for eliminating noise, and limits on values of the new frame data when the absolute values of the difference in new frame data and old frame data are the same;

new frame multiplier means;

means for supplying said new frame data concurrently to said new frame multiplier means and to said weighting function generator means;

old frame multiplier means;

old frame memory means for storing old frame data from a preceding processing step;

means for supplying said old frame data from said old frame memory means to said old frame multiplier means and concurrently to said weighting function generator means;

said weighting function generator means responsive to said new frame data, and absolute value of the difference in said new frame data and said old frame data, and constrained by the said values set in said weighting function generator means, for generating a first coefficient $(1-\omega)$, and a second coefficient $(\omega)$, said first coefficient being supplied to said new frame multiplier means and said second coefficient being supplied to said old frame multiplier means, and wherein said second coefficient $(\omega)$ being directly proportional to the absolute value of the difference in new frame data and old frame data;

said new frame multiplier means multiplying said first coefficient and said new frame data thereby to generate a first output signal;

said old frame multiplier means multiplying said second coefficient and said old frame data obtained from said old frame memory means thereby to generate a second output signal; and adding means for adding said first output signal and said second output signal, and for thereby producing a display signal which provides improved imaging of moving and stationary portions of a display with substantial eliminating of noise, and whereby the display signal is stored in said old frame memory means as an old frame data to be fed back for use in the averaging process with the next new frame data.

* * * * *